United States Patent
Matsuda et al.

(10) Patent No.: US 8,734,677 B2
(45) Date of Patent: May 27, 2014

(54) LIQUID-CRYSTAL COATING FLUID AND POLARIZING FILM

(75) Inventors: Shoichi Matsuda, Ibaraki (JP); Kyoko Ishii, Ibaraki (JP); Tadayuki Kameyama, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 69 days.

(21) Appl. No.: 13/321,439

(22) PCT Filed: Jun. 17, 2010

(86) PCT No.: PCT/JP2010/060290
§ 371 (c)(1),
(2), (4) Date: Nov. 18, 2011

(87) PCT Pub. No.: WO2011/001832
PCT Pub. Date: Jan. 6, 2011

(65) Prior Publication Data
US 2012/0062829 A1    Mar. 15, 2012

(30) Foreign Application Priority Data
Jul. 1, 2009  (JP) ................................. 2009-156802

(51) Int. Cl.
| | | |
|---|---|---|
| C09K 19/60 | (2006.01) | |
| C09K 19/54 | (2006.01) | |
| C09K 19/22 | (2006.01) | |
| G02B 5/30 | (2006.01) | |
| C09B 31/057 | (2006.01) | |
| C09B 31/072 | (2006.01) | |
| C09B 31/08 | (2006.01) | |

(52) U.S. Cl.
USPC ................ 252/299.1; 252/299.5; 252/299.68; 428/1.31; 349/194; 106/287.26

(58) Field of Classification Search
USPC .............. 252/299.1, 299.68, 299.5; 428/1.31; 106/287.26; 349/194
See application file for complete search history.

(56) References Cited

U.S. PATENT DOCUMENTS

| | | | | |
|---|---|---|---|---|
| 5,609,796 A | * | 3/1997 | Yamamoto et al. ............ | 252/585 |
| 8,189,165 B2 | * | 5/2012 | Umemoto et al. ............ | 349/167 |
| 8,591,644 B2 | * | 11/2013 | Onouchi et al. ......... | 106/287.26 |

| | | | |
|---|---|---|---|
| 2009/0040609 A1 | 2/2009 | Hasegawa et al. | |
| 2009/0275742 A1 | 11/2009 | Sano et al. | |
| 2010/0065974 A1 | 3/2010 | Iwakawa et al. | |

FOREIGN PATENT DOCUMENTS

| | | | |
|---|---|---|---|
| JP | 2006-323377 A | 11/2006 | |
| JP | 2007-126628 A | 5/2007 | |
| JP | 2008-102417 A | 5/2008 | |
| JP | 2009-139806 A | 6/2009 | |
| TW | 200712134 A | 12/2008 | |
| WO | 2009/041203 A1 | 4/2009 | |

OTHER PUBLICATIONS

International Search Report of PCT/JP2010/060290, mailing date Aug. 31, 2010.
Taiwanese Office Actiom dated Jan. 25, 2013, issued in corresponding Taiwanese Patent Application No. 099120410, with Japanese translation (10 pages).

* cited by examiner

Primary Examiner — Shean C Wu
(74) Attorney, Agent, or Firm — Westerman, Hattori, Daniels & Adrian, LLP

(57) ABSTRACT

A liquid-crystal coating fluid which comprises: an azo compound represented by the following general formula (1); and a solvent to dissolve the azo compound:

[Chemical formula 1]

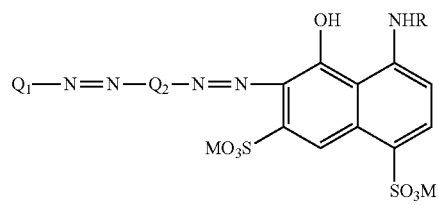

(1)

wherein $Q_1$ is an aryl group which may have any substituent group; $Q_2$ is an arylene group which may have any substituent group; R is a hydrogen atom, an alkyl group having 1 to 3 carbon atoms, an acetyl group, a benzoyl group, or a phenyl group which may have any substituent group; and M is a counter ion.

9 Claims, No Drawings

LIQUID-CRYSTAL COATING FLUID AND POLARIZING FILM

BACKGROUND OF THE INVENTION

1. Field of the Invention

The present invention relates to a liquid-crystal coating fluid and a polarizing film made therefrom.

2. Description of the Related Art

A polarizing plate obtained by dying a resin film, such as a polyvinyl alcohol or the like with iodine or a dichromatic dye and stretching the film in one direction has been widely used as a polarizing plate for a liquid crystal panel. However, there has been a problem that the aforementioned polarizing plate is poor in heat resistance and light resistance depending on the kind of the dye or the resin film. Moreover, film manufacturing equipment has become bigger as liquid crystal panels become bigger, which has become a problem.

In contrast, a method for forming a polarizing film by casting a liquid-crystal coating fluid containing a lyotropic liquid crystal compound on a substrate, such as a glass plate or a resin film and the like to orient the lyotropic liquid crystal compound is known.

The lyotropic liquid crystal compound forms supramolecular aggregates exhibiting liquid crystallinity in the solution, so that the long axis direction of the supramolecular aggregates is oriented in a flowing direction when flowing after applying shearing stress onto the liquid-crystal coating fluid containing this.

Examples of such lyotropic liquid crystal compounds include azo compounds (JP 2006-323377 A). Lyotropic liquid crystal compounds based polarizing films do not need to be stretched. In addition, it is possible to reduce the thickness of the polarizing films significantly. Further, the lyotropic liquid crystal compounds based polarizing films are expected to have potential because the thickness can be reduced significantly.

However, the polarizing film obtained by casting a liquid-crystal coating fluid including a conventional azo compound has a drawback that fine crystals are separated out in the film in a drying process, so that transparency is deteriorated due to an increase in haze (light scattering) of the polarizing film. Thus, a liquid-crystal coating fluid including a novel azo compound which has resolved this problem has been needed.

SUMMARY OF THE INVENTION

The polarizing film obtained by casting a liquid-crystal coating fluid including a conventional azo compound has a drawback that fine crystals are separated out in the film in a drying process, so that transparency is deteriorated due to an increase in haze (light scattering) of the polarizing film. It is an object of the present invention to provide a liquid-crystal coating fluid including a novel azo compound which has resolved this haze problem.

The summary of the present invention is described as follows:

In a first preferred aspect, a liquid-crystal coating fluid according to the present invention comprises: an azo compound represented by the following general formula (1); and a solvent to dissolve the azo compound:

[Chemical formula 1]

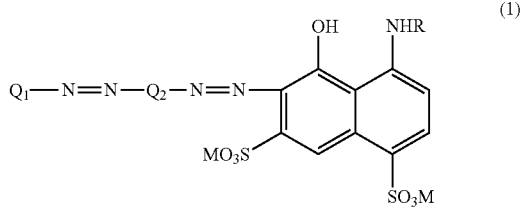

wherein $Q_1$ is an aryl group which may have any substituent group; $Q_2$ is an arylene group which may have any substituent group; R is a hydrogen atom, an alkyl group having 1 to 3 carbon atoms, an acetyl group, a benzoyl group, or a phenyl group which may have any substituent group; and M is a counter ion.

In a second preferred aspect of the liquid-crystal coating fluid according to the present invention, the solvent is a hydrophilic solvent.

In a third preferred aspect of the liquid-crystal coating fluid according to the present invention, the azo compound has a concentration of 0.5% by weight to 50% by weight.

In a fourth preferred aspect, a liquid-crystal coating fluid according to the present invention has a pH of 5 to 9.

In a fifth preferred aspect, a polarizing film according to the present invention is obtained by casting the liquid-crystal coating fluid in a thin film state, followed by drying.

Inventors of the present invention carried out extensive investigations on separating of fine crystals in a liquid-crystal coating fluid including an azo compound. As a result, they found out that it was possible to inhibit the separating by using an azo compound containing an amino naphthol skeleton in which a substituent group, such as a sulfonic acid group or the like is substituted in a specific position and to obtain a polarizing film having small haze.

An aminonaphthol skeleton has a high possibility of being a portion to be poor in solubility due to high flatness. In the liquid-crystal coating fluid of the present invention, a sulfonic acid group is introduced into a specific position to make an aminophthol skelton easily dissolved, which could lead to inhibit the separating of the fine crystals.

In the liquid-crystal coating fluid including the aforementioned azo compound, the separating of the fine crystals in the film is inhibited in casting and drying processes. As a result, the size of the fine crystals that causes haze becomes far smaller than that of conventional ones, which could lead to a decrease in haze.

ADVANTAGE OF THE INVENTION

In a polarizing film obtained by casting and drying the liquid-crystal coating fluid including an azo compound of the present invention, the separating of fine crystals in the film is inhibited in a drying process to obtain a polarizing film with small haze.

DESCRIPTION OF THE PREFERRED EMBODIMENTS

[Liquid-Crystal Coating Fluid]

A liquid-crystal coating fluid of the present invention comprises: an azo compound represented by the following general formula (1); and a solvent to dissolve the azo compound.

[Chemical formula 1]

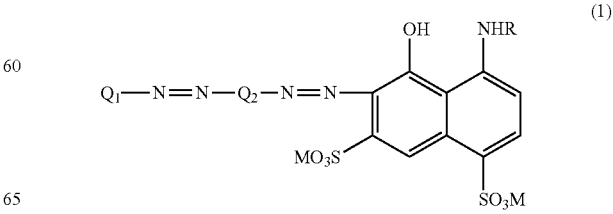

wherein $Q_1$ is an aryl group which may have any substituent group; $Q_2$ is an arylene group which may have any substituent group; R is a hydrogen atom, an alkyl group having 1 to 3 carbon atoms, an acetyl group, a benzoyl group, or a phenyl group which may have any substituent group; and M is a counter ion.

In the liquid-crystal coating fluid of the present invention, the aforementioned azo compound forms supramolecular aggregates in the solution and exhibits a liquid crystal phase. The liquid crystal phase is not particularly limited, but examples of the liquid crystal phase include a nematic liquid crystal phase, a hexagonal liquid phase or the like. These liquid crystal phases can be identified and confirmed by observing optical patterns with a polarization microscope.

The aforementioned azo compound in the liquid-crystal coating fluid of the present invention preferably has a concentration of 0.5% by weight to 50% by weight. A liquid-crystal coating fluid exhibiting a stable liquid crystal phase at least a portion of the concentration in the aforementioned range can be obtained, so that a polarizing film with a desired thickness can be easily obtained.

The liquid-crystal coating fluid of the present invention preferably has a pH of 5 to 9. A polarizing film with high orientation degree can be obtained when the pH is in the above-mentioned range. And the liquid-crystal coating fluid is superior in productivity because the coating fluid does not cause a coater made of a metal, such as stainless steel or the like to corrode.

The liquid-crystal coating fluid of the present invention may contain anything including the aforementioned azo compound and a solvent, for instance, the coating fluid of the present invention may contain other liquid crystal compound or any additives. Examples of the additives include a surfactant, an antioxidant, an antistatic agent and the like. The concentration of the additives is generally less than 10% by weight.

While the method for preparing the liquid-crystal coating fluid of the present invention is not particularly limited, an azo compound may be added to the solvent, alternatively, the solvent may be added to the azo compound.

[Azo Compound]

The azo compound to be used for the liquid-crystal coating fluid of the present invention is a compound represented by the aforementioned general formula (1) and has a property (lyotropic liquid crystallinity) to cause a phase transition of an isotropic phase into a liquid crystal phase according to changes of the concentration in a solution state dissolved in a solvent.

The azo compound represented by the aforementioned general formula (1) exhibits absorption dichroism in a visible light region (at a wavelength of 380 nm to 780 nm). And the separating of fine crystals is inhibited because of having a substituent group, such as a sulfonic acid group in a specific position to obtain a polarizing film with small haze.

In the formula (1), $Q_1$ is an aryl group which may have any substituent group; $Q_2$ is an arylene group which may have any substituent group, in which a substituent group suitable to adjust the range of the absorption wavelength is used.

R is a hydrogen atom, an alkyl group having 1 to 3 carbon atoms, an acetyl group, a benzoyl group or a phenyl group which may have any substituent group.

M is a counter ion and is preferably a hydrogen atom, an alkali metal atom, an alkali earth metal atom, a metal ion or a substituted or unsubstituted ammonium ion. Examples of a metal ion include, for instance, $Li^+$, $Ni^{2+}$, $Fe^{3+}$, $Cu^{2+}$, $Ag^+$, $Zn^{2+}$, $Al^{3+}$, $Pd^{2+}$, $Cd^{2+}$, $Sn^{2+}$, $Co^{2+}$, $Mn^{2+}$, or $Ce^{3+}$ and the like. When the counter ion M is a multivalent ion, a plurality of azo compounds share one multivalent ion (counter ion).

A monoazo compound is produced by diazotizing and coupling an aniline derivative and a naphthalene derivative in accordance with a conventional method and the obtained monoazo compound is subject to diazotization and coupling reaction with 1-amino-8-naphthol derivative to obtain an azo compound represented by the general formula (1).

[Solvent]

Solvents to be used in the present invention dissolve the aforementioned azo compounds and hydrophilic solvents are preferably used as solvents. The hydrophilic solvents are preferably water, alcohol kinds, cellosolve kinds and mixture thereof. Water-soluble compounds, such as glycerin, ethyleneglycol or the like may be added to the solvents. These additives can be used to control readily solubility and the drying rate of the liquid-crystal coating fluid.

[Polarizing Film]

A polarizing film of the present invention can be obtained by casting the liquid-crystal coating fluid of the present invention on a substrate or a surface of a metal drum, followed by drying.

While it is to be understood that the flow casting means of a liquid-crystal coating fluid is not particularly limited, if only the liquid-crystal coating fluid is uniformly cast. A flow casting means using an appropriate coater, for example, a slide coater, a slot die coater, a bar coater, a rod coater, a roll coater, a curtain coater, and a spray coater or the like is applied.

While the drying method is not particularly limited, natural drying, reduced-pressure drying, drying by heating, and drying by heating under reduced pressure or the like may be used. Any drying methods using a drying apparatus, such as an air circulation-type drying oven or heated rolls and the like are used as drying by heating means. The drying temperature in the case of drying by heating is preferably 50° C. to 120° C. The polarizing film of the present invention is preferably dried so that the amount of remaining solvent may be 5% by weight or lower with respect to the total weight.

The polarizing film of the present invention preferably exhibits absorption dichroism in a visible light region (at a wavelength of 380 nm to 780 nm). Such characteristics are obtained by the orientation of the azo compound in the polarizing film. The azo compound forms supramolecular aggregates in the liquid-crystal coating fluid. Accordingly, the long axis direction of the supramolecular aggregates is oriented in the flowing direction by casting the liquid-crystal coating fluid while applying shearing force to the liquid-crystal coating fluid. In addition to shearing force, an orientation means may combine orientation treatment, such as rubbing treatment and optical orientation or the like and orientation by a magnetic field and an electric field.

The polarizing film of the present invention preferably has a thickness of 0.1 µm to 3 µm. The polarization degree of the polarizing film of the present invention is preferably 95% or higher, more preferably 97% or higher. According to the present invention, the haze value of the polarizing film can be preferably set at 10% or lower, more preferably 5% or lower, further preferably 2% or lower.

[Substrate]

While it is to be understood that a substrate for casting the liquid-crystal coating fluid of the present invention is not particularly limited, a single layer or a laminate composed of a plurality of layers (for example, a laminate including an orientation film) may be used.

Examples of the specific substrate include a glass plate and a resin film. When the substrate includes an orientation film, the orientation film is preferably orientation treated.

Examples of the substrate including an orientation film typically include a substrate made by coating a polyimide film on a glass plate. Orientation property is given to the polyimide film by a known method, for example, by mechanical orientation treatment, such as rubbing or the like and optical orientation treatment or the like. An alkali-free glass to be used for a liquid crystal cell is preferably used as a substrate glass.

A resin film substrate is preferably used for the uses that require flexibility. The surface of the resin film may be orientation treated by rubbing or the like. Alternatively, an orientation film composed of other materials may be formed on the surface of the resin film.

While materials of the resin film used for the substrate are not particularly limited, only if the materials are resins having film forming properties, examples of the materials include stylene resins, (meta) acrylic acid resins, polyester resins, polyolefin resins, norbornene resins, polyimide resins, cellulose resins, polyvinyl alcohol resins, and polycarbonate resins or the like. Although the thickness of the substrate is not particularly limited except for its application, the thickness is generally in the range between 1 µm to 1,000 µm.

[Applications of Polarizing Film]

The polarizing film of the present invention is preferably used as a polarizing element. The polarizing element is applied to liquid crystal panels of a variety of devices, such as liquid crystal television units, personal computer displays, mobile phones, digital cameras, video cameras, portable game devices, car navigation systems, office automation appliances, factory automation, medical devices, and security gismos or the like.

The polarizing film of the present invention may be used after being released from the substrate or may be used in the state that the polarizing film is laminated on the substrate. When the polarizing film is used for an optical application while the polarizing film is laminated on the substrate, the substrate is preferably transparent to visible light. The polarizing film may be used in the state of being laminated on other support or an optical element when the polarizing film is released from the substrate.

EXAMPLES

The present invention will be more clearly understood by referring to the Examples below. However, the Examples should not be construed to limit the invention in any way.

Example 1

In accordance with a conventional method ("Riron Seizo Senryo Kagaku" Fifth Edition (Theoretical production Dye Chemistry), Yutaka Hosoda (published on Jul. 15, 1968, GIHODO SHUPPAN Co., Ltd.), pages 135 to 152), a monoazo compound was produced by diazotizing and coupling 4-nitroaniline and 8-amino-2-naphthalene sulfonic acid.

The obtained monoazo compound was diazotized by a conventional method in the same manner and was further subject to coupling reaction with 1-amino-8-naphthol-4,6-disulfonate lithium salt to obtain a rough product including an azo compound having the following structural formula (2) and salting out was carried out with lithium chloride to obtain an azo compound having the following structural formula (2):

[Chemical formula 2]

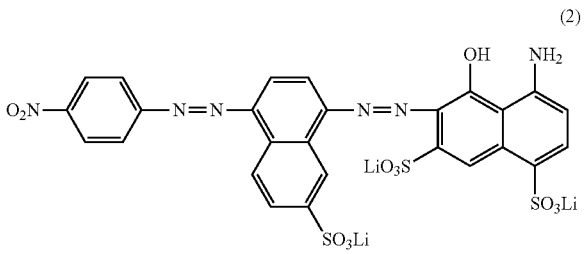

(2)

The azo compound of the aforementioned structural formula (2) was dissolved in ion-exchange water to prepare a liquid-crystal coating fluid of 20% by weight. The liquid-crystal coating fluid had a pH of 7.4. The liquid-crystal coating fluid was obtained with a polyethylene dropper and was sandwiched by two pieces of slide glasses. A nematic liquid crystal phase was observed when observing with a polarization microscope at room temperature (23° C.).

The aforementioned liquid-crystal coating fluid was diluted using ion-exchange water to prepare the solution so as to be 5% by weight. The liquid-crystal coating fluid was applied on a surface of a norbornene polymer film (produced by Nippon Zeon Co., Ltd., product name "Zeonor") with rubbing treatment and corona treatment using a bar coater (produced by BUSCHMAN, product name "Mayerrot HS9"). Subsequently, a polarizing film with a thickness of 0.6 µm was obtained by natural drying in a temperature-controlled room at 23° C. Optical characteristics of the obtained polarizing film are indicated in Table 1.

Example 2

An azo compound of the following structural formula (3) was obtained in the same manner as in Example 1 except for changing 8-amino-2-naphthalene sulfonic acid to 5-amino-2-naphthalene sulfonic acid.

[Chemical formula 3]

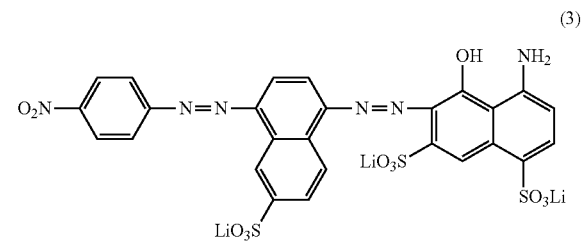

(3)

The azo compound of the aforementioned structural formula (3) was dissolved in ion-exchange water to prepare a liquid-crystal coating fluid of 20% by weight. The liquid-crystal coating fluid had a pH of 7.2. The liquid-crystal coating fluid was obtained with a polyethylene dropper and was sandwiched by two pieces of slide glasses. A nematic liquid crystal phase was observed when observing with a polarization microscope at room temperature (23° C.).

The aforementioned liquid-crystal coating fluid was diluted using ion-exchange water to prepare the solution so as to be 5% by weight. The liquid-crystal coating fluid was used to prepare a polarizing film with a thickness of 0.6 µm in the same manner as in Example 1. Optical characteristics of the obtained polarizing film are indicated in Table 1.

Comparative Example 1

An azo compound of the following structural formula (4) was obtained in the same manner as in Example 1 except for changing 1-amino-8-naphthol-2,4-disulfonate lithium salt to 7-amino-1-naphthol 3,6-disulfonate lithium salt.

[Chemical formula 4]

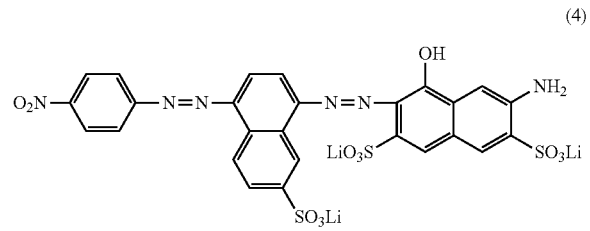

(4)

The azo compound of the aforementioned structural formula (4) was dissolved in ion-exchange water to prepare a liquid-crystal coating fluid of 20% by weight. The liquid-crystal coating fluid had a pH of 6.7. The liquid-crystal coating fluid was obtained with a polyethylene dropper and was sandwiched by two pieces of slide glasses. A nematic liquid crystal phase was observed when observing with a polarization microscope at room temperature (23° C.).

The aforementioned liquid-crystal coating fluid was used to prepare a polarizing film with a thickness of 0.6 μm in the same manner as in Example 1. Optical characteristics of the obtained polarizing film are indicated in Table 1.

Comparative Example 2

An azo compound of the following structural formula (5) was obtained in the same manner as in Comparative Example 1 except for changing 4-nitroaniline to p-anisidine.

[Chemical formula 5]

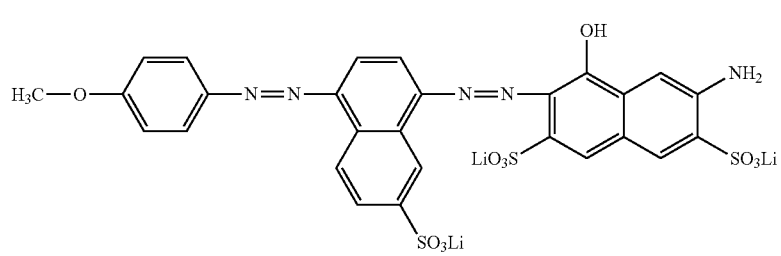

(5)

The azo compound of the aforementioned structural formula (5) was dissolved in ion-exchange water to prepare a liquid-crystal coating fluid of 20% by weight. The liquid-crystal coating fluid had a pH of 6.0. The liquid-crystal coating fluid was obtained with a polyethylene dropper and was sandwiched by two pieces of slide glasses. A nematic liquid crystal phase was observed when observing with a polarization microscope at room temperature (23° C.).

The aforementioned liquid-crystal coating fluid was diluted using ion-exchange water to prepare the solution so as to be 10% by weight. The liquid-crystal coating fluid was used to prepare a polarizing film with a thickness of 0.6 μm in the same manner as in Example 1. Optical characteristics of the obtained polarizing film are indicated in Table 1.

Comparative Example 3

An azo compound of the following structural formula (6) was obtained in the same manner as in Comparative Example 1 except for changing 4-nitroaniline to p-toluidine.

[Chemical formula 6]

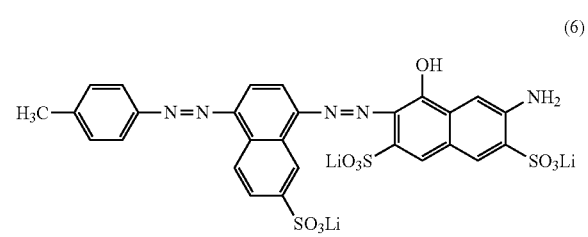

(6)

The azo compound of the aforementioned structural formula (6) was dissolved in ion-exchange water to prepare a liquid-crystal coating fluid of 20% by weight. The liquid-crystal coating fluid had a pH of 6.0. The liquid-crystal coating fluid was obtained with a polyethylene dropper and was sandwiched by two pieces of slide glasses. A nematic liquid crystal phase was observed when observing with a polarization microscope at room temperature (23° C.).

The aforementioned liquid-crystal coating fluid was diluted using ion-exchange water to prepare the solution so as to be 10% by weight. The liquid-crystal coating fluid was used to prepare a polarizing film with a thickness of 0.6 μm in the same manner as in Example 1. Optical characteristics of the obtained polarizing film are indicated in Table 1.

TABLE 1

|  | Compound | Polarization degree (%) | Haze value (%) |
| --- | --- | --- | --- |
| Example 1 | Compound (2) | 97.8 | 2.9 |
| Example 2 | Compound (3) | 96.7 | 1.3 |
| Comparative Example 1 | Compound (4) | 98.1 | 12.3 |
| Comparative Example 2 | Compound (5) | 92.5 | 17.9 |
| Comparative Example 3 | Compound (6) | 92.7 | 16.5 |

[Measurement Method]

[Thickness]

A portion of a polarizing film was released to obtain the thickness of the polarizing film by measuring the level difference using a three-dimensional measurement system of the shape of a non-contact surface (manufactured by Ryoka Systems, Inc., product name: "MM5200").

[Liquid Crystal Phase]

A small amount of the liquid-crystal coating fluid was obtained using a polyethylene dropper and was sandwiched by two pieces of slide glasses to observe using a polarization microscope (manufactured by Olympus, product name: "OPTIPHOT-POL") with a large-size sample heating and cooling stage (manufactured by Japan High Tech co., Ltd., product name: "10013L").

[pH]

The pH value of the liquid-crystal coating fluid was measured using a pH meter (produced by DENVER INSTRUMENT, product name: "Ultra BASIC").

[Polarization Degree]

Polarization transmission spectrum was measured in a range at a wavelength of 380 nm to 780 nm using a spectrophotometer (manufactured by JASCO Corporation, product name: V-7100) equipped with a Glan-Thompson polarizing element. Transmittances $Y_1$ and $Y_2$ in which visibility amendment was performed from this spectrum to obtain a polarization degree from an equation:
polarization degree=$(Y_1-Y_2)/(Y_1+Y_2)$. The transmittance $Y_1$ is a transmittance of linearly polarized light in a maximum transmittance direction and the transmittance $Y_2$ is a transmittance in a direction that is orthogonal to the maximum transmittance direction.

[Haze]

Haze was measured at room temperature (23° C.) using a haze meter (produced by MURAKAMI COLOR RESEARCH LABORATORY, product name: HR-100). A mean value of three repeated frequency was taken as a measuring value.

Industrial Applicability

The polarizing film of the present invention is preferably used as a polarizing element. A polarizing element is preferably used for liquid crystal panels for a variety of devices, such as liquid crystal panels, such as liquid crystal television units, computer displays, mobile phones, digital cameras, video cameras, portable game devices, car navigation systems, office automation appliances, factory automation, medical devices, and security gismos or the like.

What is claimed is:

1. A liquid-crystal coating fluid comprising:
    a bisazo compound represented by the following general formula (1); and
    a solvent to dissolve the bisazo compound:

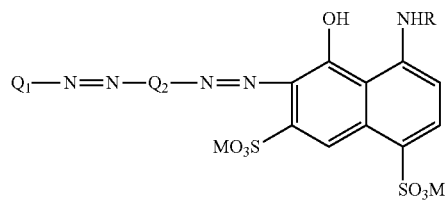

(1)

wherein $Q_1$ is an aryl group which may have any substituent group; $Q_2$ is an arylene group which may have any substituent group; R is a hydrogen atom, an alkyl group having 1 to 3 carbon atoms, an acetyl group, a benzoyl group, or a phenyl group which may have any substituent group; and M is a counter ion.

2. The liquid-crystal coating fluid according to claim 1, wherein the solvent is a hydrophilic solvent.

3. The liquid-crystal coating fluid according to claim 1, wherein the bisazo compound has a concentration of 0.5% by weight to 50% by weight.

4. The liquid-crystal coating fluid according to claim 1, wherein the liquid-crystal coating fluid has a pH of 5 to 9.

5. The liquid-crystal coating fluid according to claim 3, wherein the liquid-crystal coating fluid has a pH of 5 to 9.

6. A polarizing film obtained by casting the liquid-crystal coating fluid according to claim 1 in a thin film state, followed by drying.

7. A polarizing film obtained by casting the liquid-crystal coating fluid according to claim 3 in a thin film state, followed by drying.

8. A polarizing film obtained by casting the liquid-crystal coating fluid according to claim 4 in a thin film state, followed by drying.

9. A polarizing film obtained by casting the liquid-crystal coating fluid according to claim 5 in a thin film state, followed by drying.

* * * * *